H. D. ZINN, E. R. DANSER & L. D. VAUGHN.
WIRE SPLICE AND LEAD LINE CONNECTOR.
APPLICATION FILED JAN. 19, 1915.
1,201,909.
Patented Oct. 17, 1916.
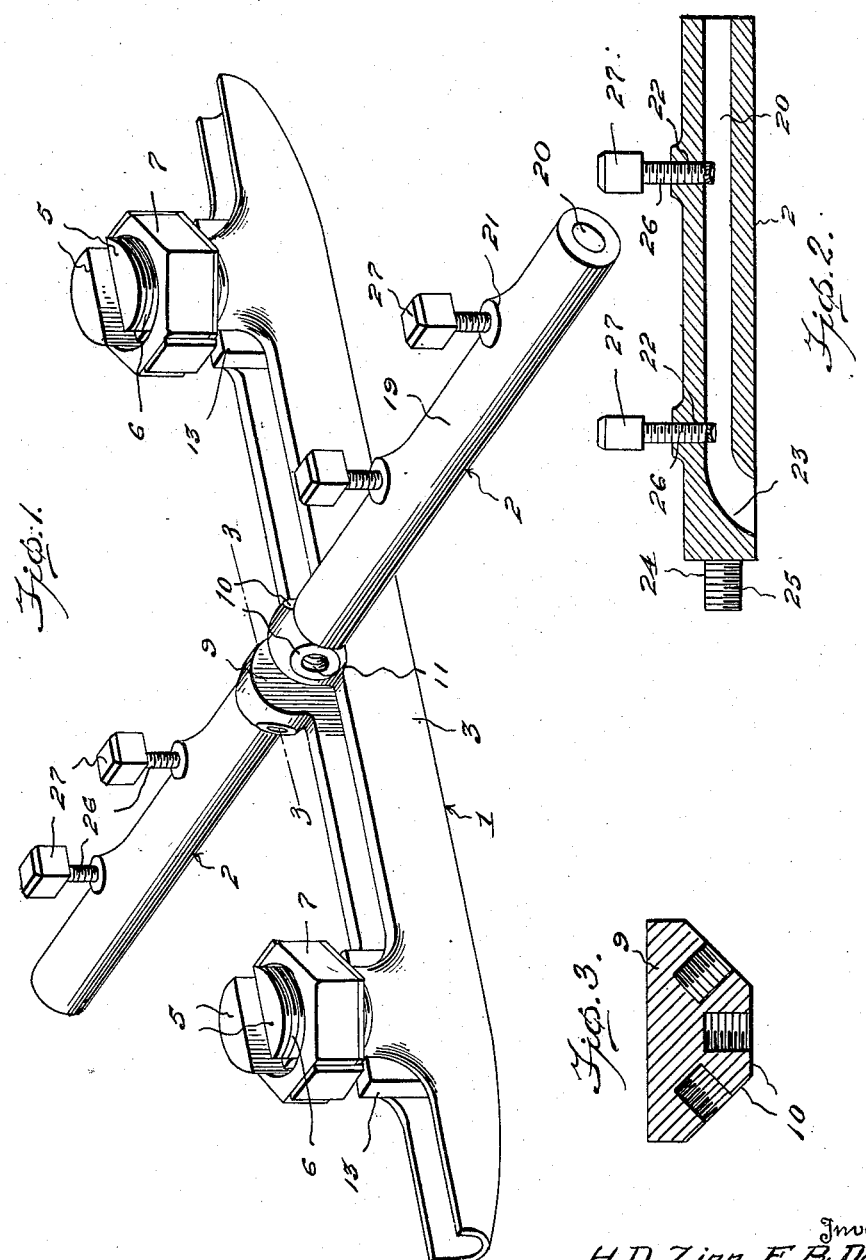

UNITED STATES PATENT OFFICE.

HARRY D. ZINN AND ELMER R. DANSER, OF TUNNELTON, AND LORENZO D. VAUGHN, OF GRAFTON, WEST VIRGINIA, ASSIGNORS, BY MESNE ASSIGNMENTS, OF ONE-HALF TO LORENZO D. VAUGHN AND ONE-HALF TO WILLIAM P. SAMPLES, BOTH OF GRAFTON, WEST VIRGINIA.

WIRE-SPLICE AND LEAD-LINE CONNECTOR.

1,201,909.  Specification of Letters Patent.  Patented Oct. 17, 1916.

Application filed January 19, 1915. Serial No. 3,096.

*To all whom it may concern:*

Be it known that we, (1) HARRY D. ZINN, (2) ELMER R. DANSER, and (3) LORENZO D. VAUGHN, citizens of the United States, residing at (1 and 2) Tunnelton and (3) Grafton, in the counties of (1 and 2) Preston and (3) Taylor, State of West Virginia, have invented certain new and useful Improvements in Wire-Splices and Lead-Line Connectors; and we do hereby declare the following to be a full, clear, and exact description of the invention, such as will enable others skilled in the art to which it appertains to make and use the same.

This invention relates to new and useful improvements in wire splice and lead line connectors, and has for its principal object to provide a device which is adapted particularly for use in mines for connecting and supporting the ends of trolley wires and the like.

Another object of the invention is to provide a device from which it is possible to take a plurality of leads to enable wires in branches or leads from the main tunnel to be charged.

A further object of the invention is to provide a novel form of clamp for holding the wires against displacement which will effectively bite into the wire and prevent the same from sagging.

With these and other objects in view, the invention consists in the novel combination and arrangement of parts which will be fully set forth in the following specification and accompanying drawings, in which, Figure 1 is a perspective view of a wire splice and lead line connector constructed in accordance with this invention showing the same in condition to be used with the lead lines connected thereto, Fig. 2 is a longitudinal sectional view of one of the lead line connectors, Fig. 3 is a horizontal sectional view taken on the line 3—3 of Fig. 1.

Referring now to the drawings by characters of reference, the numeral 1 designates as an entirety the trolley wire support and splicer, while the numerals 2 designate as entireties the lead line connectors.

Taking the separate elements up for description in the order mentioned, the wire splice and connector 1 comprises a U-shaped body 3, which U-shaped body is elongated to form a trough in which the trolley wire lies. Formed intermediate the ends of the body 3 and extending upwardly from the arms of the body 3 are the semi-cylindrical extensions 5 which are preferably externally screw threaded as at 6 to receive the clamping nuts 7. These semi-cylindrical extensions are spaced from each other to form the slot which is in direct longitudinal alinement with the longitudinal axis of the trough. Formed intermediate the semi-cylindrical extensions 5 and centrally of the longitudinal terminals of the trough are the ears 9 which are formed with the flattened faces 10, which faces are centrally apertured as at 11 and these apertures are preferably internally screw threaded to receive the threaded boss 25 on the lead line connectors 2.

Taking up the description of the lead or feed line connector, the same comprises a cylindrical body 19 having formed therein a longitudinally extending axial bore 20. This body is also formed with a pair of spaced bosses 21 which are formed with internally screw threaded apertures 22 the inner ends of which communicate with the bore 20. The bore 20 hereinbefore referred to communicates with the arcuate bore 23 at its inner end and this arcuate bore opens to the side of the lead or feed line connector opposite the threaded openings 22. A longitudinally extending cylindrical boss 24 is formed at the closed end of the cylindrical body 19 and this boss is externally screw threaded as at 25 and is arranged to fit the internally screw threaded bore 11 formed in the ears 9. Extending into the threaded bores 22 and part way into the bore 20 of the body 19 of the lead line connector 2 are the threaded stems 26 of the screws 27 which are designed to coöperate with the lower wall of the lead or feed line connector in clamping the lead lines in place.

It will be apparent from the foregoing that when it is desired to use the device as a splicer, the ends of the trolley wires which are to be spliced are placed in the splicer and the clamping member 13 is then slipped into place between the semi-cylindrical extensions 5. The nut 7 is then threaded on to the threads 6 of the semi-cylindrical member 5, to hold the clamping members in place. In order to prevent the nut from being accidentally displaced, it is to be understood that a nut lock of any preferred type may be provided. After the line has been spliced and it is desired that the lead lines be connected thereto, the lead or feed line connectors are placed in position by threading the boss 24 into the threaded recess 11. The lead wires are then spliced in the axial bore 20 of the connector and the clamping screws turned so as to firmly grip the lead wires and it will be clearly seen that the said wires will be held against accidental movement.

From the foregoing it is obvious that a particularly simple and efficient wire splice and connector is provided which will effectively secure broken ends of a line wire together and also provide a means for connecting lateral leads to the line wire.

It is to be understood that this invention includes all electric wire connections pertaining to lead or feed wires facilitating the coming into or going away from the main trolley line, telephone lines and telegraph lines or machine wire lines in coal mines and all other wire connections wherein a main line and a plurality of lead lines are used.

While in the foregoing there has been shown and described the preferred embodiment of this invention, it is to be understood that such changes may be made in the combination and arrangement of parts as will fall within the spirit and scope of the invention as defined in the appended claims.

What is claimed is:

1. The combination with a splice and lead line connector, said splice being formed centrally with upstanding ears having a plurality of flattened faces, a plurality of lead line connectors adapted to be secured to the faces of the upstanding ears to form a connection for branch lead wires.

2. In combination a splice and lead line connector, said splice being formed with centrally upstanding ears having a plurality of flattened faces, each of said faces provided with central apertures being internally screw threaded, a plurality of lead line connectors comprising tubular bodies, a threaded part on one end of tubular bodies adapted to be inserted into the apertures of the flattened face of the connector to hold the ends of the lead line therein.

3. In combination a splice and lead line connector, said splice being formed with centrally upstanding ears having a plurality of radially disposed faces, each of said faces provided with central apertures internally screw threaded, a tubular body, a threaded boss on one end of the tubular body, said body being provided with transversely extending internal screw threaded apertures, and clamping screws extending into the apertures to engage the lead wires and hold the same against accidental movement, and a threaded boss on the end of the tubular body adapted to be inserted in the openings of the flattened faces of the splice.

4. In combination, a trolley wire splice, a lug on the splice provided with a plurality of angularly related sockets, and a lead wire connector adapted to have one of its ends secured in any one of said sockets.

5. In combination, a trolley wire splice, a lug on the splice provided with a plurality of angularly related faces, and a lead wire connector adapted to have one of its ends secured to any one of said faces.

6. In combination, a splice and a lead line connector, said splice being formed with a central upstanding ear having a plurality of radially disposed apertures formed therein, a tubular body, a threaded boss on one end of the tubular body, said body being provided with transversely extending, internally screw threaded apertures, and clamping screws extending into the apertures to engage the lead wires and hold the same against accidental movement.

In testimony whereof we affix our signatures in presence of two witnesses.

HARRY D. ZINN.
ELMER R. DANSER.
LORENZO D. VAUGHN.

Witnesses:
JOHN J. McKONE,
D. E. WATSON.